(12) United States Patent
Park et al.

(10) Patent No.: US 10,304,359 B2
(45) Date of Patent: May 28, 2019

(54) DISPLAY DEVICE

(71) Applicant: LG DISPLAY CO., LTD., Seoul (KR)

(72) Inventors: DaeSung Park, Paju-si (KR); Jongsik Ham, Gwangmyeong-si (KR)

(73) Assignee: LG DISPLAY CO., LTD., Seoul (KR)

( * ) Notice: Subject to any disclaimer, the term of this patent is extended or adjusted under 35 U.S.C. 154(b) by 71 days.

(21) Appl. No.: 14/744,660

(22) Filed: Jun. 19, 2015

(65) Prior Publication Data

US 2016/0186944 A1   Jun. 30, 2016

(30) Foreign Application Priority Data

Dec. 26, 2014 (KR) .......................... 10-2014-0191084

(51) Int. Cl.
| | | |
|---|---|---|
| *G02F 1/13357* | (2006.01) | |
| *F21V 23/00* | (2015.01) | |
| *G09F 13/00* | (2006.01) | |
| *G02F 1/1333* | (2006.01) | |
| *G02F 1/1335* | (2006.01) | |

(52) U.S. Cl.
CPC ........ *G09F 13/00* (2013.01); *G02F 1/133308* (2013.01); *G02F 1/133608* (2013.01); *G02F 2001/13332* (2013.01); *G02F 2001/133317* (2013.01)

(58) Field of Classification Search
CPC .. G02B 6/0038; G02B 6/0036; G02B 6/0066; G02B 6/0068; G02B 6/0021; G02B 6/0088; G02F 1/133603; G02F 1/133615; G02F 1/133608; G02F 1/133604; G02F 1/133308; G02F 2001/133314; G02F 2001/133317; G02F 2001/13332

USPC ........................................................... 439/67
See application file for complete search history.

(56) References Cited

U.S. PATENT DOCUMENTS

| | | | | |
|---|---|---|---|---|
| 7,561,224 B2 * | 7/2009 | Lee | ................... | G02F 1/133608 349/56 |
| 8,096,669 B2 * | 1/2012 | Ito | ........................ | G02B 3/0006 362/620 |
| 8,553,174 B2 * | 10/2013 | Que | .................. | G02F 1/133615 349/58 |
| 8,576,551 B2 * | 11/2013 | Oh | ......................... | F16M 11/10 349/58 |
| 8,624,856 B2 * | 1/2014 | Kim | .................... | G02F 1/13338 345/173 |

(Continued)

FOREIGN PATENT DOCUMENTS

| | | |
|---|---|---|
| CN | 101101716 A | 1/2008 |
| CN | 101477264 A | 7/2009 |

(Continued)

*Primary Examiner* — Alan B Cariaso
(74) *Attorney, Agent, or Firm* — Birch, Stewart, Kolasch & Birch, LLP

(57) ABSTRACT

A display device is discussed. A back light unit support structure such as a light source housing for supporting a part of a back light unit and the structure of a back cover are optimized, so that a display panel circuit unit is disposed on the lower front surface of the display device operated in a non-folding COF scheme. Accordingly, a flat plate type back cover may be used and a wall mounting through-hole is provided in an upper edge support member, thereby the display device may be simply installed to the wall in close contact with a wall.

21 Claims, 8 Drawing Sheets

(56) References Cited

U.S. PATENT DOCUMENTS

| | | | | |
|---|---|---|---|---|
| 8,632,200 B2* | 1/2014 | Takeuchi | ........... | G02F 1/133603 |
| | | | | 362/311.01 |
| 8,833,998 B2* | 9/2014 | Kuo | .................... | G02B 6/0088 |
| | | | | 362/606 |
| 8,858,007 B2* | 10/2014 | Kim | .................... | H05K 1/0203 |
| | | | | 362/613 |
| 8,897,837 B2* | 11/2014 | Song | .................. | H04M 1/0254 |
| | | | | 455/552.1 |
| 8,905,565 B2* | 12/2014 | Baek | ................ | G02F 1/133308 |
| | | | | 362/97.1 |
| 9,039,265 B2* | 5/2015 | Yang | .................... | G02B 6/0031 |
| | | | | 362/606 |
| 9,116,267 B2* | 8/2015 | Franklin | ............. | G02B 6/0031 |
| 2008/0186430 A1* | 8/2008 | Seo | ....................... | G02B 6/0088 |
| | | | | 349/65 |
| 2008/0239193 A1* | 10/2008 | Jang | .................. | G02F 1/133308 |
| | | | | 349/58 |
| 2008/0297681 A1* | 12/2008 | Yang | ................. | G02F 1/133308 |
| | | | | 349/58 |
| 2012/0262634 A1* | 10/2012 | Takano | ................ | G02B 6/0055 |
| | | | | 348/790 |
| 2013/0155653 A1 | 6/2013 | Kim et al. | | |
| 2014/0055699 A1* | 2/2014 | Yu | ........................ | G02F 1/1335 |
| | | | | 349/42 |

FOREIGN PATENT DOCUMENTS

| | | |
|---|---|---|
| CN | 201965374 U | 9/2011 |
| JP | 2005-284189 A | 10/2005 |

* cited by examiner

DISPLAY DEVICE

CROSS-REFERENCE TO RELATED APPLICATION

This application claims priority from and the benefit under 35 U.S.C. § 119(a) of Korean Patent Application No. 10-2014-0191084, filed on Dec. 26, 2014, which is hereby incorporated by reference for all purposes as if fully set forth herein.

BACKGROUND OF THE INVENTION

1. Field of the Invention

Embodiments of the present invention relate to a display device and, more particularly, to a wall-mountable display device which includes a flat back cover, a non-folding type front circuit module, and an upper edge support structure having a wall mounting through-hole therein so as to be simply installed to the wall in close contact with a wall.

2. Description of the Related Art

With the development of information society, various types of requirements for a display device for displaying an image are increasing. Recently, various display devices, such as a Liquid Crystal Display (LCD), a Plasma Display Panel (PDP), and an Organic Light Emitting Diode Display Device (OLED) have come into use.

Among such display devices, the LCD includes: an array substrate including a thin-film transistor as a switching device for controlling an on/off state of each pixel area; an upper substrate including a color filter and/or a black matrix; a display panel including a liquid crystal material layer formed therebetween; a driving unit for controlling the thin-film transistor; and a Back Light Unit (BLU) for providing light to the display panel. In the LCD, an arrangement state of a liquid crystal material is adjusted according to an electric field applied between a pixel electrode provided in the pixel area and a common voltage electrode and transmittance of light is adjusted, to thereby display an image.

In an instance of the LCD, there should be a back light unit for providing light from the outside, and the back light unit may include sub-units such as a light source, a light guide plate, a reflection plate, an upper sheet, and may include one or more frames or chassis as a support structure for mounting such sub-units.

A cover bottom, which is a plate-shaped member for supporting a part of the side surface and the rear surface of the black light unit, and a guide panel or a guide sheet provided with regard to the cover bottom to support a part between the back light unit and a display panel are employed as such a frame or a chassis.

In general, although the cover bottom is configured by a metal material and the guide panel is formed by a plastic material, the embodiments of the present invention are not limited thereto.

Further, a case top can be used as a frame which interworks with and is coupled to the cover bottom and the guide panel and extends from the side surface of the display device to a part of the front surface of the display panel so as to protect the display panel.

An example of such a display device is a Liquid Crystal Module (LCM), and a set device or a set electronic device such as a television, a monitor including the LCM may use a front cover and a back cover as a structure for forming the outmost structure, in addition to the cover bottom which is a support structure of the display device.

Since such a back cover should have a receiving space formed therein to receive the display device, the back cover is formed to be a plastic structure having a complex structure. Further, the back cover should have the constant thickness in order to cover and protect a system board mounted on the rear surface of the display panel.

Further, since a separate mounting bracket should be mounted on a wall in order to fixedly install the display device such as the TV or the set device on the wall, the installation of the mounting bracket is cumbersome, and since the display device largely protrudes from the wall, the outer appearance thereof is not appealing.

Further, since the conventional set device such as the TV separately includes various input/output connectors, at least 4 to 5 cables are required in order to connect an external device such as a set-top box and an acoustic device and so on. Thus, such usage of multiple connectors or cables may be cumbersome and inconvenient and the outer appearance is not appealing.

The embodiments of the present invention have been proposed to solve the above-mentioned problem, and an aspect of the present invention is to provide a display device having a simple structure, which can be installed on a wall while being in close contact with the wall and can use a single cable.

SUMMARY OF THE INVENTION

An aspect of the present invention is to provide a display device in which a structure of a light source housing for supporting a part of a back light unit and the structure of a back cover are optimized so that a front circuit module connected to the display panel in a Non-folding COF scheme is disposed on a front lower surface of the display device and a flat back cover is used so as to be installed on a wall while being in close contact with the wall.

Another aspect of the present invention is to provide a display device in which a wall mounting through-hole is formed in an upper edge support part of the display device, so as to be simply fixed on a wall even without a separate mounting member.

Yet another aspect of the present invention is to provide a display device in which a singular connector including a plurality of signal terminals and a plurality of electric power terminals is provided so that the singular cable can be used when the display device is connected to an external device.

Yet another aspect of the present invention is to provide a display device which can be installed on a wall while being in close contact with the wall even without a separate installation member and use a singular input/output cable, thereby having an excellent outer appearance.

In order to achieve the aforementioned aspect, in accordance with an embodiment of the present invention, a display device is provided. The display device includes: a display panel; a back light unit to provide light to the display panel; a display panel driving circuit to drive the display panel; a back light unit support member disposed on a lower side of the display panel, and having a driving circuit receiving part disposed on a front surface of the back light unit support member to receive the display panel driving circuit; an edge support member disposed on an upper side of the display panel and having a wall mounting through-hole formed therein; and a flat plate back cover disposed to cover a rear surface of the back light unit.

In accordance with another embodiment of the present invention, a display device is provided. The display device includes: a display panel; a back light unit to provide light to the display panel; a display panel driving circuit to drive the display panel; a back light unit support member disposed on a lower side of the display panel, and having a driving circuit receiving part disposed on a front surface of the back light unit support member to receive the display panel driving circuit; an edge support member disposed on an upper side of the display panel and having a wall mounting through hole formed therein; a flat plate back cover disposed to cover a rear surface of the back light unit; a display panel driving circuit (S-PCB) received in the driving circuit receiving part; a connector including a plurality signal terminals and a plurality of power terminals; and a system board and a power board which are connected through the connector and a cable.

In accordance with another embodiment of the present invention, a display device is provided. The display device includes a display panel; a back light unit to provide light to the display panel; a flat plate back cover disposed to cover a rear surface of the back light unit, so that the back light unit is interposed between the display panel and the flat plate back cover; a case top having a first portion extending parallel to the flat plate back cover, and a second portion extending perpendicular to the flat plate back cover; a display panel driving circuit to drive the display panel; a back light unit support member disposed between the first portion of the case top and the flat plate back cover, the backlight unit support member having a driving circuit receiving part disposed on a front surface of the back light unit support member to receive the display panel driving circuit, and having a extending portion that is coplanar with the flat plate back cover; and an edge support member disposed on an upper side of the display panel and having a wall mounting through-hole formed therein An embodiment of the present invention provides a display device which can be installed on a wall while being in close contact with the wall even without a separate installation member and which use a singular input/output cable, thereby having an excellent outer appearance.

In detail, in a display device according to an embodiment of the present invention, the structure of a back cover and a back light support structure such as a light source housing for supporting a part of a back light unit are optimized so that a display panel driving circuit using a non-folding COF scheme is disposed on a front lower surface of the display device and a flat back cover is used so as to be installed on a wall while being in close contact with the wall.

Further, the display device has a wall mounting through-hole formed in an upper edge support part thereof so that the display device can be simply mounted on a wall without a separate mounting member while being in close contact with the wall.

Further, in accordance with an embodiment of the present invention, a singular connector including a plurality of signal terminals and a plurality of electric power terminals is provided so that a singular cable can be used when the display device is connected to an external device, thereby ensuring an excellent outer appearance.

BRIEF DESCRIPTION OF THE DRAWINGS

The above and other objects, features and advantages of the embodiments of the present invention will be more apparent from the following detailed description taken in conjunction with the accompanying drawings, in which.

DETAILED DESCRIPTION OF THE EMBODIMENTS

Figure 1:
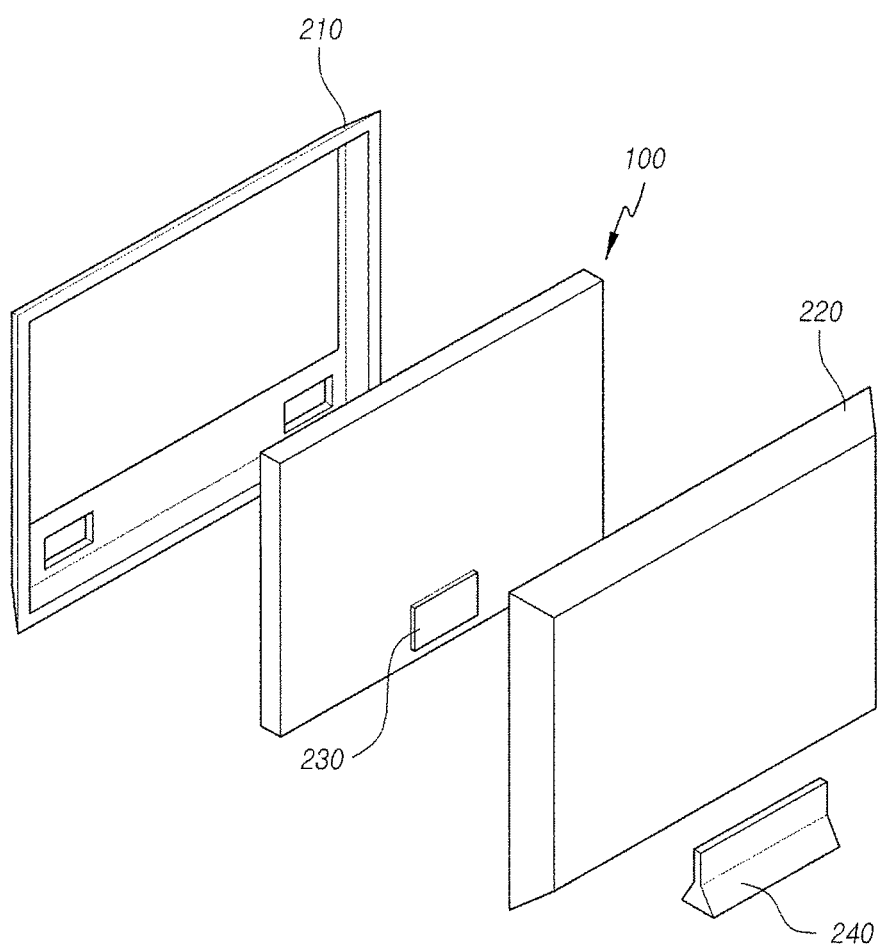
FIG. 1 is an exploded perspective view illustrating a set electronic device including a display device according to a related art.

Hereinafter, embodiments of the present invention will be described with reference to the accompanying drawings. In the following description, the same elements will be designated by the same reference numerals although they are shown in different drawings. Further, in the following description of the embodiments of the present invention, a detailed description of known functions and configurations incorporated herein will be omitted when it obscures the subject matter of the embodiments of the present invention.

In addition, terms, such as first, second, A, B, (a), (b) or the like may be used herein when describing components of the embodiments of the present invention. Each of these terminologies is not used to define an essence, order or sequence of a corresponding component but used merely to distinguish the corresponding component from other component(s). In the instance that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 2:
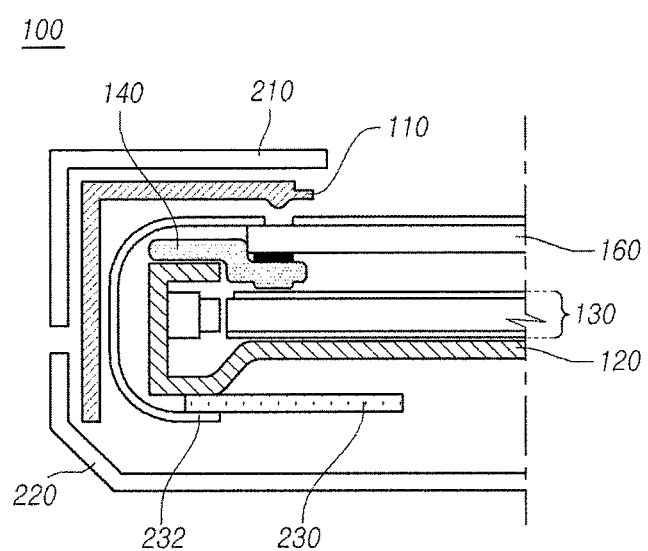
FIG. 2 is a sectional view illustrating a side part of the display device of FIG. 1.

FIG. 1 is an exploded perspective view illustrating a set electronic device including a display device according to the related art and FIG. 2 is a sectional view illustrating a side portion of the display device of FIG. 1.

As illustrated in FIG. 1, a set device including a display device to which an embodiment of the present invention can be applied includes a display device 100 such as a Liquid Crystal Module (LCM), a front cover 210 which covers a part of the side surface and a part of the front surface of the display device and is made of a plastic material, a back cover 220 or a rear cover for covering a part of the side surface and the entirety of the rear surface of the display device, a system board part 230 mounted on the rear surface of the display device, and a stand 240 on which the display device or the set device is installed.

Although an LCD can be a representative example of the display device 100, the embodiments of the present invention are not limited thereto. Further, all types of display devices such as a PDP, an OLED, etc., may be used as the display device.

A detailed configuration of the display device 100 will be described below with reference to FIG. 2.

The display device includes a display panel 160 such as a liquid crystal display panel, a back light unit 130 disposed on a lower part thereof to irradiate light to the display panel 160, and a cover bottom 120 which supports the back light unit 130 by extending on the entirety of the rear surface of the display device and which is made of a metal or plastic material.

Further, a guide panel 140, which has a structure for connecting the back light unit 130 and the display panel 160 while being fixed to the cover bottom 120 and is made of a plastic material, may be further provided. A double-sided tape is attached on a part of the upper surface of the guide panel 140 and the display panel 160 is disposed thereon, so that the display panel 160 can be fixedly mounted.

Further, the display device 100 may further include a case top 110 which covers the outmost side surfaces of the cover bottom 120 and the guide panel 140 and is bent and extends to a part of the front surface of the display panel 160, thereby protecting a front edge of the display panel 160.

The case top 110 extends to a part of the front of the display panel 160 while surrounding the side surface of the display device 100, thereby protects the display panel 160 and a Chip-On-Film (COF) circuit part which is a connection circuit for connecting the system board part 230 as a Printed Circuit Board (PCB) disposed on the rear side of the cover bottom 120 to drive the display device 100 with the display panel 160.

When the display panel 160 is a liquid crystal display panel, the display panel 160 may include an array substrate having a plurality of gate lines, a plurality of data lines, a pixel defined by an intersecting area thereof and a thin-film transistor as a switching device for adjusting a light transmission degree at each pixel; an upper substrate including a color filter and/or a black matrix and so on; and a liquid crystal material layer formed therebetween.

Meanwhile, the display panel to which the embodiments of the present invention can be applied is not limited to such a liquid crystal display panel, and may include a display device which emits light by itself such as an OLED as well as the PDP.

As illustrated in FIG. 2, the back light unit 130 used for an LCD according to an embodiment of the present invention may include a plurality of sub-units such as a light source module including a light source such as an LED, a holder for fixing the light source, a light source driving circuit; a Light Guide Plate (LGP) or a diffusion plate for diffusing light to the entirety of a panel area; a reflection plate for reflecting light towards the display panel; an LED flexible printed circuit for controlling an on/off state of the light source; and one or more optical films or sheets arranged on an upper portion of the light guide plate for the purpose of use of brightness improvement, diffusion of light and protection.

Further, the cover bottom 120 constituting the display device 100, which is a plate-shaped member made of a metal material or a plastic material, includes a rear portion for supporting the entirety of the display device and a side portion extending therefrom to cover a part of the side surface of the back light unit 130.

The guide panel 140 is a plastic structure coupled to the cover bottom 120 to attach the display panel 160 on an upper side of the guide panel while covering a part of the front surface of the back light unit 130.

Meanwhile, as illustrated in FIG. 1, the front cover 210 and the back cover 220 in addition to the display device 100 are used for constituting the set electronic device.

The front cover 210 is a member which covers the entirety of the unsmooth side surface of the display device 100 and extends in an "L" shape towards the front surface of the display panel, thereby covers and protects a part of the front surface of the display device.

Meanwhile, the back cover 220 in the set electronic device includes a rear part for covering the rear surface of the display device (i.e., the entirety of the rear surface of the cover bottom 120) and a side part being bent and extending from the rear part to be coupled to a distal end of the outer side surface of the front cover 210 in contact with the distal end.

In the present specification, the term "display device" is used to refer to a display device such as a LCM (Liquid Crystal Module) including a display panel and a driving unit for driving the display panel as well as a concept including even a set electronic device or a set device such as a television, a computer monitor, and a mobile electronic device such as a smartphone and an electronic pad, which are complete products including such an LCM.

That is, in the present specification, the term of "the display device" is used to refer to a display device such as the LCM and a set device which is an application product including the same.

In the display device in FIGS. 1 and 2, a so-called full-folding scheme is used in which the system board part 230 of the display panel is mounted on the rear surface of the display panel so as to be connected to the display panel on the front surface through the COF. In the instance of the full-folding scheme in which a system board part or a display panel driving circuit is disposed on the rear of the display panel, the volume of the back cover 220 increases, and particularly, the back cover 220 has a polyhedral shape having a constant volume in order to protect such a system board part.

Figure 3:
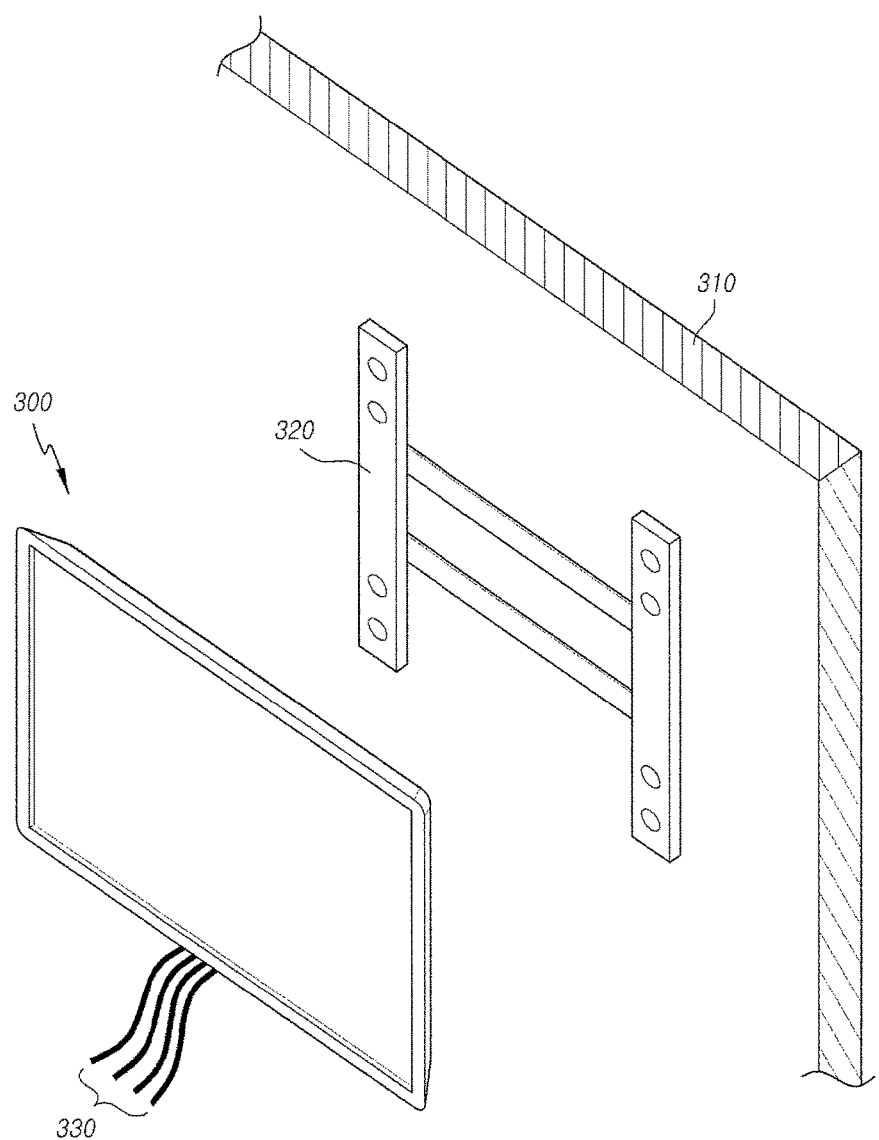
FIG. 3 illustrates a state in which the display device of FIG. 1 is mounted on a wall.

FIG. 3 illustrates a state in which the display device of FIG. 1 is mounted on a wall.

Meanwhile, as illustrated in FIG. 3, in order to fix a display device 300 (e.g., a TV, etc.) having the back cover on a wall 310 as in FIGS. 1 and 2, a separate mounting bracket 320 is fixedly installed on the wall 310, and the display device 300 is fixedly installed in a mounting structure of the mounting bracket 320.

Thus, it is very difficult to mount the display device on the wall, and thus, only a professional service worker can install the wall mountable display device on the wall. Accordingly, the installation is inconvenient, and even after the installation, the display device is not in close contact with the wall and significantly protrudes from the wall due to the mounting bracket 320, the thick back cover 220, etc.

Further, as illustrated in a lower portion of FIG. 3, the display device such as a TV or a monitor according to the related art includes a plurality of connectors or terminals such as a composite terminal, a S-video terminal, a component terminal, an HDMI terminal for inputting/outputting a voice/image signal and includes a plurality of power connector for providing power to a light source such as an LED.

Thus, a plurality of connection cables 330 are required in order to connect the display device such as a TV and a monitor to an external device such as a set-top box or a set device such as a computer, and accordingly the connection is inconvenient and the outer appearance is not appealing.

The embodiments of the present invention have been proposed to solve the aforementioned problem, and an aspect of the present invention is to provide a display device in which a driving circuit of the display device is disposed as a non-folding type front circuit unit and a flat plate back cover is used so that the display device can be installed on the wall while being in close contact with the wall, and a wall mounting through-hole is formed in an upper edge support structure of the display device so that the display device can be simply installed on the wall using a string even without a separate mounting member.

Figure 4:
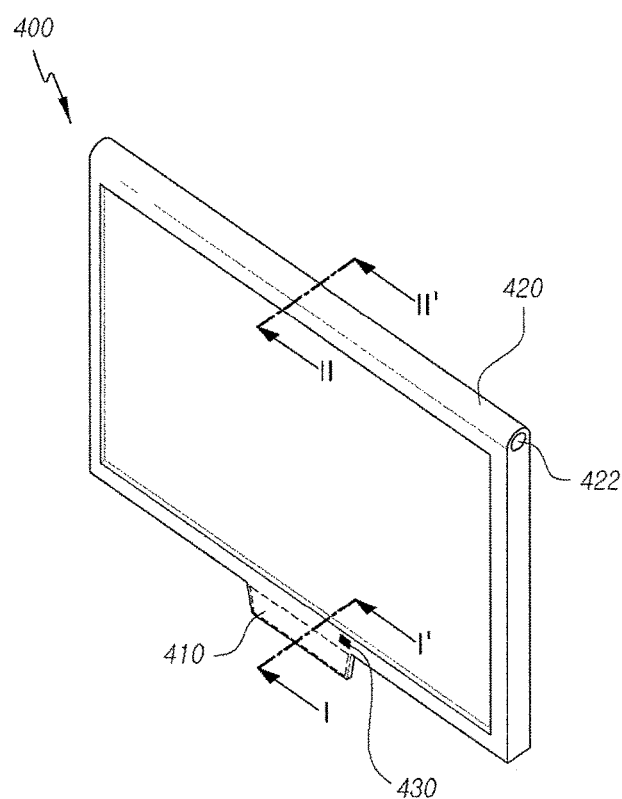
FIG. 4 is a perspective view illustrating the entirety of the display device according to an embodiment of the present invention.
Figure 5:
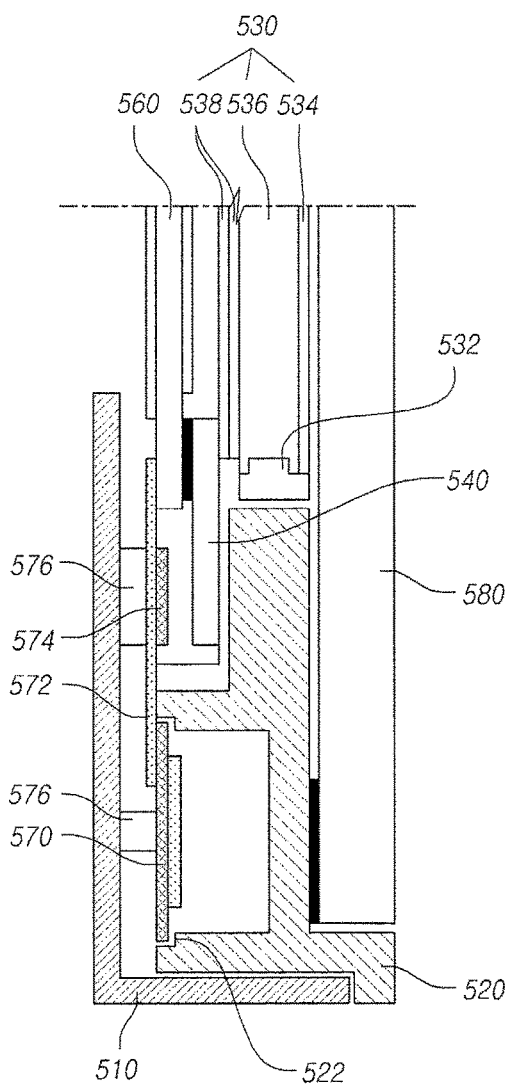
FIG. 5 is a sectional view taken along line I-I' corresponding to a lower portion of the display device of FIG. 4
Figure 6:
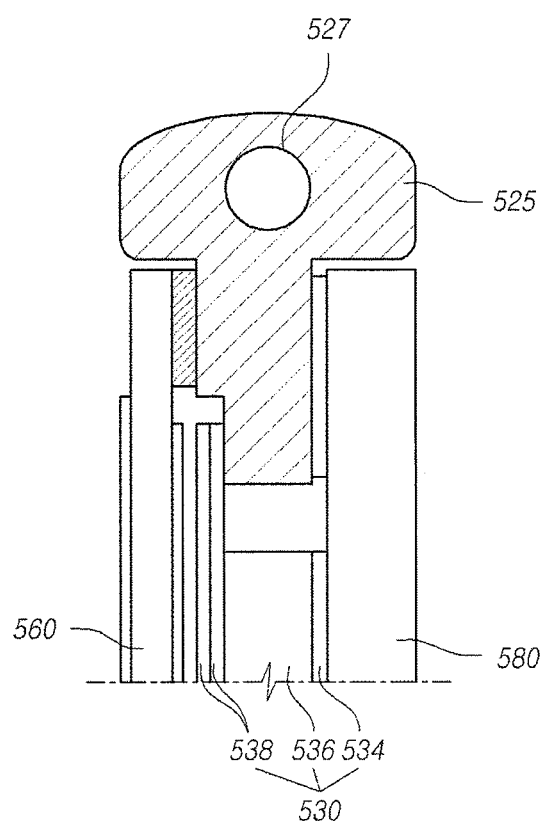
FIG. 6 is a sectional view taken along line II-II' corresponding to an upper portion of the display device of FIG. 4.

FIG. 4 is a perspective view illustrating the entirety of a display device according to an embodiment of the present invention, FIG. 5 is a sectional view taken along line I-I' corresponding to a lower portion of the display device of FIG. 4, and FIG. 6 is a sectional view taken along line II-II' corresponding to an upper portion of the display device of FIG. 4.

As illustrated in FIG. 4, a display device 400 according to an embodiment of the present invention may include a front circuit module 410 disposed at a front lower end portion thereof and an edge support member 420 for supporting an upper edge thereof and having a wall mounting through-hole 422 formed therein, in addition to a general configuration of a display device.

Further, the display device 400 may further include a singular connector 430 including a plurality of signal terminals and a plurality of power terminals.

FIG. 5 is a sectional view taken along line I-I' corresponding to a front lower area of the display device of FIG. 4. As illustrated in FIG. 5, a display device according to an embodiment of the present invention may include: a display panel 560; a back light unit 530 which is disposed on one side of the display panel 560 and includes a light source module 532 for providing light to the display panel 560; a back light unit support member 520 which supports a part of the back light unit 530 on a lower portion of the display panel 560 and has a driving circuit receiving part 522 formed on the front surface thereof to receive a display panel driving circuit for driving the display panel 560; an edge support member 525 which is disposed on an upper portion of the display panel, being opposite to the back light support member 520 and supports at least one of the display panel 560 and the back light unit 530, and which has a wall mounting through-hole 527 formed therein; a flat-plate back cover 580 which is disposed to cover the rear surface of the back light unit 530 and has a flat shape.

Meanwhile, the back light unit support member 520 may be a light source housing such as an LED housing disposed only on one edge of a lower portion of the display panel 560. The display panel driving circuit received in the driving circuit receiving part formed in the back light support member 520 may be a Source-Printed Circuit Board (S-PCB), and such a S-PCB may be connected to one side of the display panel 560 by a non-folding type COF 572 which is not bent.

Further, the display device may further include a case top 510 which covers the side surface of the back light unit support member 520 and is bent and extends towards one side of an edge of the front surface of the display panel 560. A heat dissipation member 576 for dissipating heat generated by a circuit may be additionally disposed between the inner side surface of the case top 510 and the COF.

In the present specification, the term of "lower portion" means a lower portion when the display device or the set device is normally operated and the low portion implies an edge where the light source module and the back light unit support member are arranged. Further, in the present specification, the term of "upper portion" means an upper portion when the display device or the set device is normally operated and the upper portion implies an edge where the edge support member having the wall mounting through-hole formed therein is arranged.

Further, in the present specification, the front surface implies a surface viewed by a user, i.e., the front side of the display panel, and the rear surface implies a back cover-side direction, which is a direction opposite thereto.

Meanwhile, in the aforementioned embodiment of the present invention, the edge support member having the wall mounting though-hole 527 formed therein includes all type of members for supporting an upper edge of the display device, and may be represented by a mounting cabinet, a middle cover assembly and so on but is not limited thereto.

Hereinafter, a detailed configuration of elements of the display device according to an embodiment of the present invention, which is illustrated in FIGS. 4 to 6, will be described in more detail.

The display panel 560 used in an embodiment of the present invention may be a liquid display panel, but is not limited thereto, and is interpreted to include all types of display panels such as a PDP, an OLED, etc.

When the display panel 560 according to an embodiment of the present invention is a liquid crystal display panel, the display panel 160 may include an array substrate having a plurality of gate lines, a plurality of data lines, a pixel defined by an intersecting area thereof and a thin-film transistor as a switching device for adjusting a light transmission degree at each pixel; an upper substrate including a color filter and/or a black matrix and so on; and a liquid crystal material layer formed therebetween. In addition, a touch window may be additionally disposed on a front upper surface of the display panel 560.

Further, the display panel 560 may further include upper/lower polarizing plates.

Further, the back light unit 530 used in an embodiment of the present invention may include a plurality of sub-units such as a light source module 532 including a light source such as an LED; a LGP 536 or a diffusing plate for diffusing light to the entirety of a panel area; a reflection plate 534 for reflecting light in a display panel direction; an LED Flexible Printed Circuit (LED FPC) for controlling an on/off state of the light source; one or more optical films or sheets 538 arranged on an upper portion of the LGP 536 for the purpose of use of brightness improvement, diffusion of light and protection.

In an embodiment of the present invention, the light source module 532 may include a light source element and a light source holder or a light source PCB having a long plate structure, which supports the light source element and includes an LED driving circuit for driving a light source. An LED, a light emitting diode strip, or the like may be used as the light source element of the light source module 532, but the light source element is not limited thereto, and all types of light sources which can provide required light to the display panel can be used as the light source element.

The LGP 546 may be formed by a rectangular plastic sheet which is generally die-cut, forcibly pressed, or injection-molded from a plastic sheet. Further, light from a light source such as a light emitting diode array is emitted to an edge of the LGP 546 and is diffused across the rear surface of the display panel while being total-reflected inside the LGP 546, and light, which is emitted through the flat upper surface of the LGP 546, functions as back light of the display panel.

The reflection plate 534 is located on the rear surface of the LGP 546, and reflects light, which has passed through the rear surface of the LGP 546, towards the display panel 560, thereby improving the brightness of light.

An optical sheet 538 disposed on an upper portion of the LGP 536 includes a diffusing sheet, at least one light collecting sheet. The optical sheet 538 is used for diffusing or collecting light which has passed through the LGP 536 such that a more uniform surface-light is introduced into the display panel 560.

Further, the back light unit support member 520 in an embodiment of the present invention is used for supporting the light source module 532 of the back light unit 530. The back light unit support member 520 includes a driving circuit receiving part 522 for receiving the display panel driving circuit 570 on a front central area simultaneously, so that the display panel driving circuit 570 is disposed on a front lower surface of the display device.

Further, the COF 572, which is a connection circuit for connecting the display panel driving circuit 570 to the display panel 560, has a so-called non-folding shape which is not bent and extends flatly.

Figure 8:
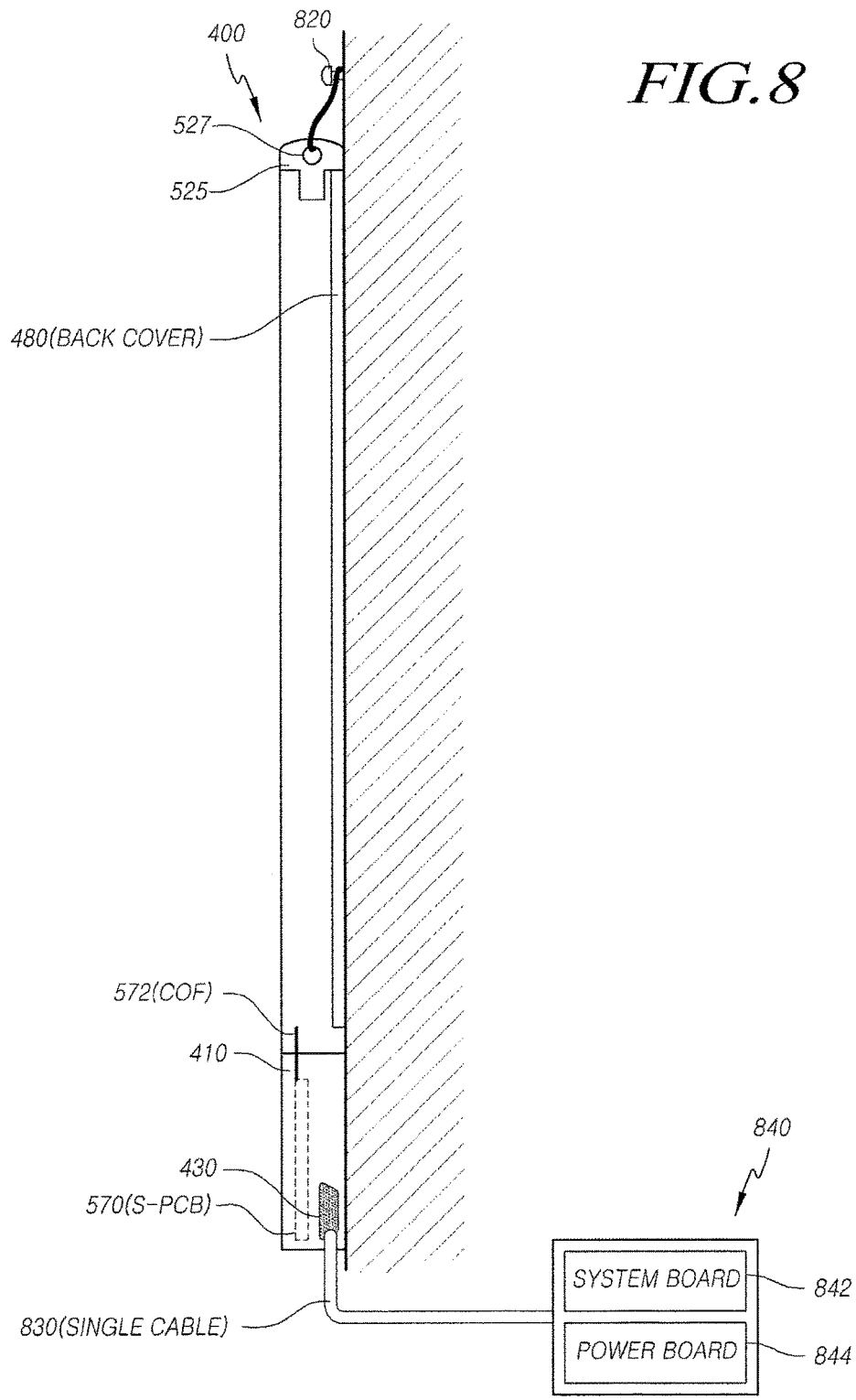
FIG. 8 is a side view illustrating a state in which the display device according to an embodiment of the present invention is mounted on a wall.

In the display device according to the related art as illustrated in FIGS. 1 to 3, the system board 230 is disposed on the rear surface of the cover bottom so that a bent COF 232 should be used for connecting the system board 230 to the front portion of the display panel 160. However, in the embodiments of the present invention, since a system board or the display panel driving circuit 570 is disposed on a lower front surface of the display device, the flat plate type back cover 580 can be used as the rear surface of the display device, and thus, as illustrated in FIG. 8, the display device can be installed on a wall while being in close contact with the wall.

In an embodiment of the present invention, the back light unit support member 520 may be a part of a LED housing or a cover bottom. In addition, the back light unit support member 520 should be interpreted to include all types of members which are arranged at a lower edge of the display device support a part of the back light unit, more specifically, the light source module of the back light unit, and have a driving circuit receiving part formed on a partial front area thereof.

Meanwhile, the driving circuit receiving part 522 may be formed by a stepped part arranged in a rectangular shape on a front center of the back light unit support member 520 as illustrated in FIG. 5.

That is, the stepped part, by which an edge of the display panel driving circuit 570 can be caught at the center of the back light unit support member 520, is formed in a rectangular shape, thereby forming an entirely rectangular receiving space.

At this time, when a cover bottom is modified and used as one example of the back light unit support member 520, the cover bottom may be used as other representations, e.g., a base frame, a metal frame, a metal chassis, a chassis base. Further, the cover bottom should be interpreted to include all types of frames or plate-shaped structures, which is arranged on the lowest base part of the display device as a support construction for fixing at least one of the display panel and the back light unit.

Further, the display device according to an embodiment of the present invention may additionally include a light cover 540 which is arranged at the edge area of the optical sheet 538, supports the display panel 560 arranged at an upper portion, and prevents light from leaking towards the edge of the optical sheet.

Such a light cover 540 may be formed as a long-plate-shaped or band-shaped structure of general plastic material which is arranged on an upper portion of the optical sheet 538 while overlapping a part of the edge of the optical sheet 538 and has a constant width.

Meanwhile, in an embodiment of the present invention, the display panel driving circuit 570 arranged in the driving circuit receiving part 522 formed on the front surface of the back light unit support member 520 may correspond to a source PCB for providing a data output signal or a source output signal to a data line formed in the display panel.

Further, although a COF circuit is described as one example of the connection circuit for connecting the display panel driving circuit 570 to the display panel 560 in the specification for the convenience, other expressions for the COF circuit such as a FPC, a chip-on-film, a chip-on flexible printed circuit and so on may be used.

In general, the COF, the FPC, the TCP, or the like is an electrical element in which a wiring or a circuit for electrically connecting different circuit wirings is formed on a flexible insulating film. Although the COF and the TCP have a slight difference, the COF and the TCP have a common feature in that a circuit wiring is formed on a film or a tape which has the flexibility and can be insulated. Further the COF and the TCP can perform the same function in the display element so that the COF and the TCP can be used while substituting the COF and the TCP for each other. Thus, in an embodiment of the present invention, both the COF and the TCP can be provided, and the COF will be representatively described.

Further, in an embodiment of the present invention, a Drive-IC (D-IC) 574 arranged on one side of the COF 572 can be additionally included, and the heat dissipation member 576 may be disposed between the inner side surface of the case top 510 and the COF 572.

In particular, such a heat dissipation member 576 may be arranged only on an area where the display panel driving circuit 570 and the D-IC 574 are arranged among the entire area of the COF. Examples of the heat dissipation member 576 may be an Al foam pad, a thermal foam pad, or an aluminum tape for directly enclosing a circuit, but are not limited thereto. Further, in some instances, the heat dissipation member 576 may be a protrusion structure which protrudes from the inner surface of the case top 510 in an embossed type to be in contact with the COF, thereby performing a heat dissipation function. Using such a heat dissipation structure, heat generated by a circuit such as the D-IC is properly emitted to the outside, thereby preventing damage to a circuit, resulting from overheat.

Further, the case top 510 used in an embodiment of the present invention, which is a metal "L"-shaped plate-shaped member for covering and protecting a front edge of the display panel and the side surface of the display device, can be arranged only on a lower edge of the display device in which the light source module and the back light unit support member 520 are arranged.

The case top in the present specification may be interpreted to include all types of covers, and/or frames, which extend from the side surface of the display device to a part of the front surface thereof and protects a part of the front surface of the display panel, and is not necessarily limited to the term of "case top".

Meanwhile, in an embodiment of the present invention, the edge support member 525 having the wall mounting through-hole 527 formed therein includes all types of support structures which forms an side outer portion of the display device including an upper portion of the display device, which upper portion is an edge portion being opposite to the light source and the back light unit support member 520, and supports a part of the back light unit and the display panel from the interior thereof.

In some instances, such an edge support member 525 may be a frame shape for covering three surfaces except for a lower edge of the display device. In this instance, the wall mounting through-hole 527 may be formed only along an upper edge of the display device among edges of the three surfaces.

Further, the wall mounting through-hole 527 may be a hole penetrated along the lengthwise direction of the edge support member 525 or may be two holes formed on both ends in the lengthwise direction of the edge support member 525 at a constant depth.

Such an edge support member 525 may be made of the same material as that of the back light unit support member 520 and may be manufactured in a frame form entirely enclosing four sides while being connected to the back light unit support member 520.

The edge support member 525 in the present specification is not limited to the term, and may be defined to be other terms such as a mount cabinet and a middle cover assembly, and should be interpreted to include all members which are disposed on an outer area including an upper edge of the display panel and functionally support the back light unit or the side surface of the display panel from the inside.

Figure 7:
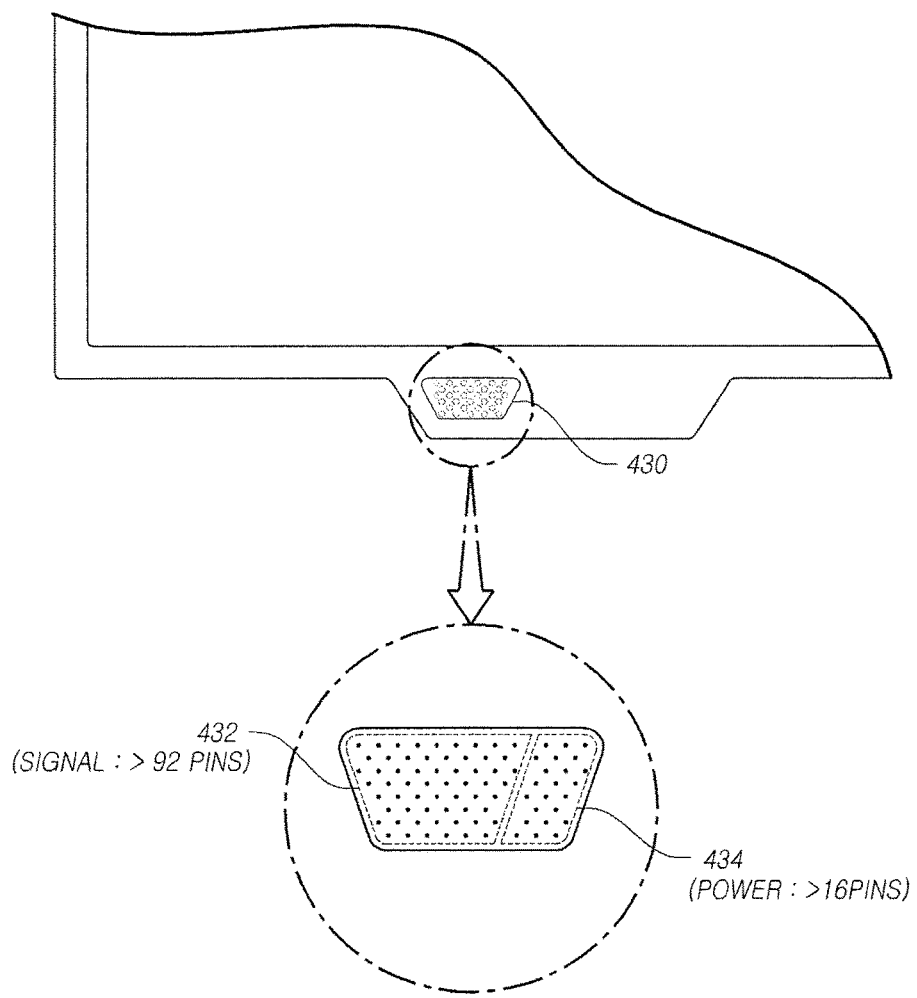
FIG. 7 illustrates a detailed configuration of a singular connector used in the display device according to an embodiment of the present invention.

FIG. 7 illustrates a detailed configuration of a singular connector used in the display device according to an embodiment of the present invention.

The display device according to the embodiments of the present invention may include a singular connector 430 including a plurality of signal terminals and a plurality of power terminals in order to be connected to an external device by a singular cable.

As illustrated in FIG. 7, such a singular connector 430 may include a signal terminal area 432 having a plurality of signal terminals or user cable terminals formed therein, and a power terminal area 434 having a plurality of power terminals or LED connector terminals formed therein.

92 or more signal terminal pins including a GND terminal, an Rxim terminal, an Rxip terminal (i=1, 2, 3 . . . ) are arranged on the signal terminal area 432 and 16 or more power terminal pins including an Ri cathode (i=1, 2, 3 . . . ), an anode R, an anode L. are arranged on the power terminal area 434.

As a result, the singular connector 430 according to an embodiment of the present invention may have 100 or more of terminal pins arranged therein and the display device may be connected to an external device, e.g., a TV set-top box by a singular cable having a connection connector corresponding thereto.

That is, as compared with the conventional display device which is connected to an external device through various cables, the display device according to an embodiment of the present invention can be connected to an external device with a singular cable by using the singular connector 430, so that the installation may be convenient and the outer appearance can be excellent.

Meanwhile, such a singular connector is preferably formed on a lower portion of the display device, i.e., adjacent to the display panel driving circuit 570 towards the lower side, but is not limited thereto, and may be arranged on the side surface of the display device.

However, since the display device according to an embodiment of the present invention should be in close contact with a wall, the singular connector should not be arranged on the rear surface of the singular connector.

FIG. 8 is a side view illustrating a state in which the display device according to an embodiment of the present invention is mounted on a wall.

As illustrated in FIG. 8, the display device 400 according to an embodiment of the present invention is disposed on a lower front portion of the display device while the front circuit module 410 has a non-folding COP form. Accordingly, the display device 400 may include a flat plate back cover 480, and the wall mounting through-hole 527 is provided in the edge support member 525 on an upper portion of the display device.

That is, since the display panel driving circuit 570 such as an S-PCB is disposed in the driving circuit receiving part formed at a part of the central front surface of the back light support unit 520 disposed on a lower portion of the display device and the display panel driving circuit 570 is directly connected to the display panel 560 by a not-bent COF 572 so that the flat plate back cover 480 can be used in the embodiments of the present invention contrary to the conventional display device in which the system board is disposed on the rear surface of the display device so that a polyhedral thick back cover should be used.

Thus, when such a display device is installed on a wall, the flat plate back cover 480 is directly disposed on the wall in close contact with the wall.

Further, a separate bracket or a separate fixing structure used for the conventional display device is not required for fixing the display device on the wall in the embodiments of the present invention, and the display device can be simply fixed on a wall only by allowing a string to pass through the wall mounting through-hole 527 formed in the edge support member 525 on the upper portion and then hanging the display device on a nail 820.

Further, the display device can be connected to an external device (e.g., a set-top box, etc.) by the singular cable 830 by using the singular connector 430 including both the plurality of signal terminals and power terminals and being formed on a lower portion or a side surface of the display device.

Meanwhile, in an embodiment illustrated in FIG. 8, only the S-PCB 570 and the D-IC are included on the lower front surface inside the display panel such as the LCM, and the system board 842 and the power board 844 may be included in a separate external device or the module 840 connected through the singular connector 430 and the singular cable 830.

That is, only a driving circuit (the S-PCB and the D-IC) for driving the display panel is included on the front lower portion of the panel. Further, the system board 842 and the power board 844 as display controllers of a set device are included in a separate external device or a module 840, and the external device or the module 840 are connected by the singular connector 430 and the singular cable 830, so that a configuration of connection cables of the display device can be simplified.

As above, according to an embodiment of the present invention, the back light unit support structure such as a light source housing disposed at a lower edge of the display device and a structure of the back cover are optimized, so that the display panel driving circuit is disposed on a lower front surface of the display device in a non-folding COF scheme and accordingly, the flat back cover can be used. Thus, the display device can be installed in close contact with the wall.

Further, the display device has a wall mounting through-hole formed in an upper edge support part thereof so that the display device can be simply mounted on a wall even without a separate mounting member while being in close contact with the wall.

Further, the singular connector including the plurality of signal terminals and the plurality of power terminals is provided on the lower surface or the side surface of the display device, so that when the display device is connected to an external device, the singular cable can be used, thereby achieving convenience of the installation and ensuring an excellent outer appearance.

While the technical spirit of the embodiments of the present invention has been by example described with reference to the accompanying drawings, it will be understood by a person skilled in the art that the embodiments of the present invention may be varied and modified in various forms without departing from the scope of the embodiments of the present invention. Accordingly, the embodiments disclosed in the present invention are merely to not limit but describe the technical spirit of the present invention. Further, the scope of the technical spirit of the present invention is not limited by the embodiments. The scope of the embodiments of the present invention shall be construed on the basis of the accompanying claims in such a manner that all of the technical ideas included within the scope equivalent to the claims belong to the present invention.

What is claimed is:

1. A display device comprising:
   a display panel;
   a back light unit to provide light to the display panel;
   a display panel driving circuit to drive the display panel;
   a back light unit support member disposed on a lower side of the display panel, and having a driving circuit receiving part disposed on a front surface of the back light unit support member to receive the display panel driving circuit; and
   a flat plate back cover disposed to cover a rear surface of the back light unit,
   wherein the display panel driving circuit is coplanar with the display panel and disposed on the lower side of the display panel as a non-folding shape, and
   wherein the driving circuit receiving part includes a stepped part disposed on a front of the back light unit support member.

2. The display device of claim 1, wherein the back light unit support member is a light source housing, and a display panel driving circuit, which is a Source-Printed Circuit Board (S-PCB), is connected to the display panel by a Chip-On-Film (COF).

3. The display device of claim 2, further comprising a case top which covers a side surface of the back light unit support member and is bent and extends to one side of an edge on a front surface of the display panel.

4. The display device of claim 3, further comprising a heat dissipation member disposed between an inner side surface of the case top and the COF, wherein a Drive-IC (D-IC) is disposed at one side of the COF, and the heat dissipation member is disposed between the inner side surface of the case top and a portion of the COF on which the D-IC is disposed.

5. The display device of claim 1, further comprising an edge support member on an upper side of the display panel and having a wall mounting through-hole that extends along a lengthwise direction thereof.

6. The display device of claim 1, further comprising a connector including signal terminals and power terminals.

7. The display device of claim 1, wherein the stepped part is disposed on a front center of the back light unit support member in a rectangular shape.

8. A display device comprising:
   a display panel;
   a back light unit to provide light to the display panel;
   a flat plate back cover disposed to cover a rear surface of the back light unit, so that the back light unit is interposed between the display panel and the flat plate back cover;
   a case top having a first portion extending parallel to the flat plate back cover, and a second portion extending perpendicular to the flat plate back cover;
   a display panel driving circuit to drive the display panel;
   a back light unit support member disposed between the first portion of the case top and the flat plate back cover, the backlight unit support member having a driving circuit receiving part disposed on a front surface of the back light unit support member to receive the display panel driving circuit, and having a extending portion that is coplanar with the flat plate back cover; and
   an edge support member disposed on an upper side of the display panel, wherein the display panel driving circuit is coplanar with the display panel and disposed on the lower side of the display panel as a non-folding shape,
   wherein the flat plate back cover is directly attached to the edge support member and the back light unit support member.

9. The display device of claim 8, wherein the extending portion of the back light unit support member separates the second portion of the case top from an end of the flat plate back cover.

10. The display device of claim 8, wherein the extending portion of the back light unit support member is further coplanar with the second portion of the case top.

11. The display device of claim 8, wherein the edge support member has a through-hole formed parallel to the flat plate back cover.

12. The display device of claim 8, wherein the edge support member, the extending portion of the back light unit support member and the flat plate back cover are coplanar.

13. A display device comprising:
   a display panel;
   a back light unit to provide light to the display panel;
   a display panel driving circuit to drive the display panel;
   a back light unit support member disposed on a lower side of the display panel, and comprising:
     an outer driving circuit receiving part disposed on a front surface of the back light unit support member to receive the display panel driving circuit,
     an inner driving circuit receiving part disposed on the front surface of the back light unit support member and between the display panel and the display panel driving circuit, and
     a rear extending portion disposed on a rear surface of the back light unit support; and
   a flat plate back cover disposed coplanar with the rear extending portion and to cover a rear surface of the back light unit,
   wherein the display panel driving circuit is disposed on the lower side of the display panel as a non-folding shape without overlapping with the display panel in a viewing direction of the display device.

14. The display device of claim 13, further comprising:
   a connector having a plurality of signal terminals and a plurality of power terminals; and a system board and a power board each connected to the connector.

15. The display device of claim 13, further comprising an edge support member on an upper side of the display panel and having a wall mounting through-hole that extends along a lengthwise direction thereof.

16. A display device comprising:
a display panel having an array of pixels;
a circuit module, having elements that provide control to the display panel, operatively connected to the display panel at the bottom edge thereof in a non-folded or non-flipped configuration, wherein the circuit module is coplanar with the display panel;
a rectangular frame configured to accommodate the display panel and the circuit module and having a receiving part at a front portion thereof to receive the circuit module;
a back cover attached to the frame, covering a rear of the display panel, and configured to have a flat rear surface; and
a single terminal at one edge of the frame and configured to receive a single connection cable that is capable of supplying power and carrying signals to and from the display panel with respect to an external device.

17. The display device of claim 16, wherein at least the top edge of the frame is configured as a wall mounting member or is configured to receive a wall mounting member.

18. The display device of claim 16, further comprising:
a heat dissipation element configured at a rear of the display panel, at an inner portion of the back cover, or between the display panel and the back cover.

19. The display device of claim 18, wherein the display panel is configured to emit light based upon Liquid Crystal Display (LCD) technology.

20. The display device of claim 18, wherein the display panel is configured to emit light based upon Organic Light Emitting Diode Display (OLED) technology.

21. The display device of claim 18, wherein the display panel is suitable for television or monitor outputs.

* * * * *